(12) United States Patent
Pritam

(10) Patent No.: US 8,233,390 B2
(45) Date of Patent: Jul. 31, 2012

(54) PRIORITY AND SOURCE AWARE PACKET MEMORY RESERVATION AND FLOW CONTROL IN FORWARDING PLANES

(75) Inventor: Baruah Pritam, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 117 days.

(21) Appl. No.: 12/710,239

(22) Filed: Feb. 22, 2010

(65) Prior Publication Data

US 2011/0205897 A1 Aug. 25, 2011

(51) Int. Cl.
- H04J 1/16 (2006.01)
- H04J 3/14 (2006.01)
- H04L 1/00 (2006.01)
- H04L 12/26 (2006.01)
- H04L 12/28 (2006.01)
- H04L 12/56 (2006.01)

(52) U.S. Cl. ........ 370/229; 370/231; 370/233; 370/234; 370/236; 370/237; 370/238; 370/240; 370/414; 370/416; 370/418; 370/419

(58) Field of Classification Search .......... None
See application file for complete search history.

(56) References Cited

U.S. PATENT DOCUMENTS

| | | | |
|---|---|---|---|
| 6,088,736 A | 7/2000 | Manning et al. | |
| 6,170,022 B1 * | 1/2001 | Linville et al. | 710/29 |
| 7,215,641 B1 * | 5/2007 | Bechtolsheim et al. | 370/235 |
| 7,843,829 B1 * | 11/2010 | Truong et al. | 370/235 |
| 2004/0213153 A1 * | 10/2004 | Nagato et al. | 370/230 |
| 2006/0092845 A1 * | 5/2006 | Kwan et al. | 370/235 |
| 2010/0046368 A1 * | 2/2010 | Kaempfer et al. | 370/231 |
| 2010/0085966 A1 * | 4/2010 | Samuels et al. | 370/389 |

* cited by examiner

*Primary Examiner* — Gary Mui
*Assistant Examiner* — Lonnie Sweet
(74) *Attorney, Agent, or Firm* — Blakely Sokoloff Taylor & Zafman, LLP

(57) ABSTRACT

A source-based memory usage table is accessed to identify a source having a memory usage satisfying a predetermined memory usage threshold, the source-based memory usage table including a plurality of source records, each corresponding to a source from which packets are received. A first flow control signal is transmitted to the identified source that has a memory usage satisfying the corresponding predetermined memory usage threshold to control further packet transmission from the identified source. A priority-based memory usage table is accessed to identify a priority of which a memory usage satisfies a predetermined memory usage threshold of the priority. A second flow control signal is transmitted to one or more sources associated with the identified priority having a memory usage satisfying the corresponding predetermined memory usage threshold to control further packet transmission from the identified one or more sources.

21 Claims, 10 Drawing Sheets

| Source ID | XON Threshold | XOFF Theshold | Current Usage | Max Usage |
|---|---|---|---|---|
| Source 1 | . . . | . . . | . . . | . . . |
| Source 2 | . . . | . . . | . . . | . . . |
| . . . | . . . | . . . | . . . | . . . |
| Source N | . . . | . . . | . . . | . . . |

FIG. 2A

| Priority ID | XON Threshold | XOFF Theshold | Current Usage | Max Usage |
|---|---|---|---|---|
| Priority 1 | . . . | . . . | . . . | . . . |
| Priority 2 | . . . | . . . | . . . | . . . |
| . . . | . . . | . . . | . . . | . . . |
| Priority N | . . . | . . . | . . . | . . . |

FIG. 2B

PRIORITY AND SOURCE AWARE PACKET MEMORY RESERVATION AND FLOW CONTROL IN FORWARDING PLANES

FIELD OF THE INVENTION

Embodiments of the invention relate generally to the field of network packet processing; and more particularly, to packet memory reservation and flow control.

BACKGROUND

Reserving memory for incoming packets in a packet memory is a fundamental operation in forwarding planes of a network element. If the packet memory is unavailable or running low, an incoming packet may either be dropped or flow control may be asserted to the active sources such that no more packets are sent to this destination until memory becomes available. Conventional methods for reserving memory includes global packet memory reservation, in-band credit based flow control, out-of-band flow control based on a memory usage that is not priority and source specific, and flow control decision and supporting process always in a fast path.

Global packet memory reservation is simple to implement and is acceptable in most forwarding planes but it is often incorrect and unfair because it does not allow source and priority specific admittance control and flow control. In-band flow control is based on the occupancy of a fast buffer at a line input. Flow control based on usage of this buffer is not directly aware of packet memory reservations in main memory and hence it is insufficient. Furthermore, this fast buffer occupancy is influenced by a diversity of downstream logic and hence tends to lose specificity of priority and source.

Out-of-band flow control based solely on global memory usage leads to a loss of source isolated backpressure and also leads to unfairness among different traffic priorities supported by the fast path. Flow control decisions are typically made in a fast path. This may slow down the fast path and often requires an implementation of complex and expensive hardware (which may in turn require expensive internal random access memory or RAM for aliasing tables). An implementation completely in the fast path also implies that the flow control function typically lags behind the packet transmission function at the source. Thus it is conceptually a reactive mechanism rather than a preventive mechanism.

SUMMARY OF THE DESCRIPTION

According to one aspect of the invention, a source-based memory usage table is accessed to identify a source having a memory usage satisfying a predetermined memory usage threshold, the source-based memory usage table including a plurality of source records, each corresponding to a source from which packets are received. Each source record includes a current memory usage and a predetermined memory usage threshold of the respective source. A first flow control signal is transmitted to the identified source that has a memory usage satisfying the corresponding predetermined memory usage threshold to control further packet transmission from the identified source. A priority-based memory usage table is accessed to identify a priority of which a memory usage satisfies a predetermined memory usage threshold of the priority. Each priority record includes a current memory usage and a predetermined memory usage threshold associated with the respective priority. A second flow control signal is transmitted to one or more sources associated with the identified priority having a memory usage satisfying the corresponding predetermined memory usage threshold to control further packet transmission from the identified one or more sources.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

FIGS. 2A-2B are block diagrams illustrating examples of data structures of a memory usage table according to some embodiments of the invention.

DETAILED DESCRIPTION

Figure 1:
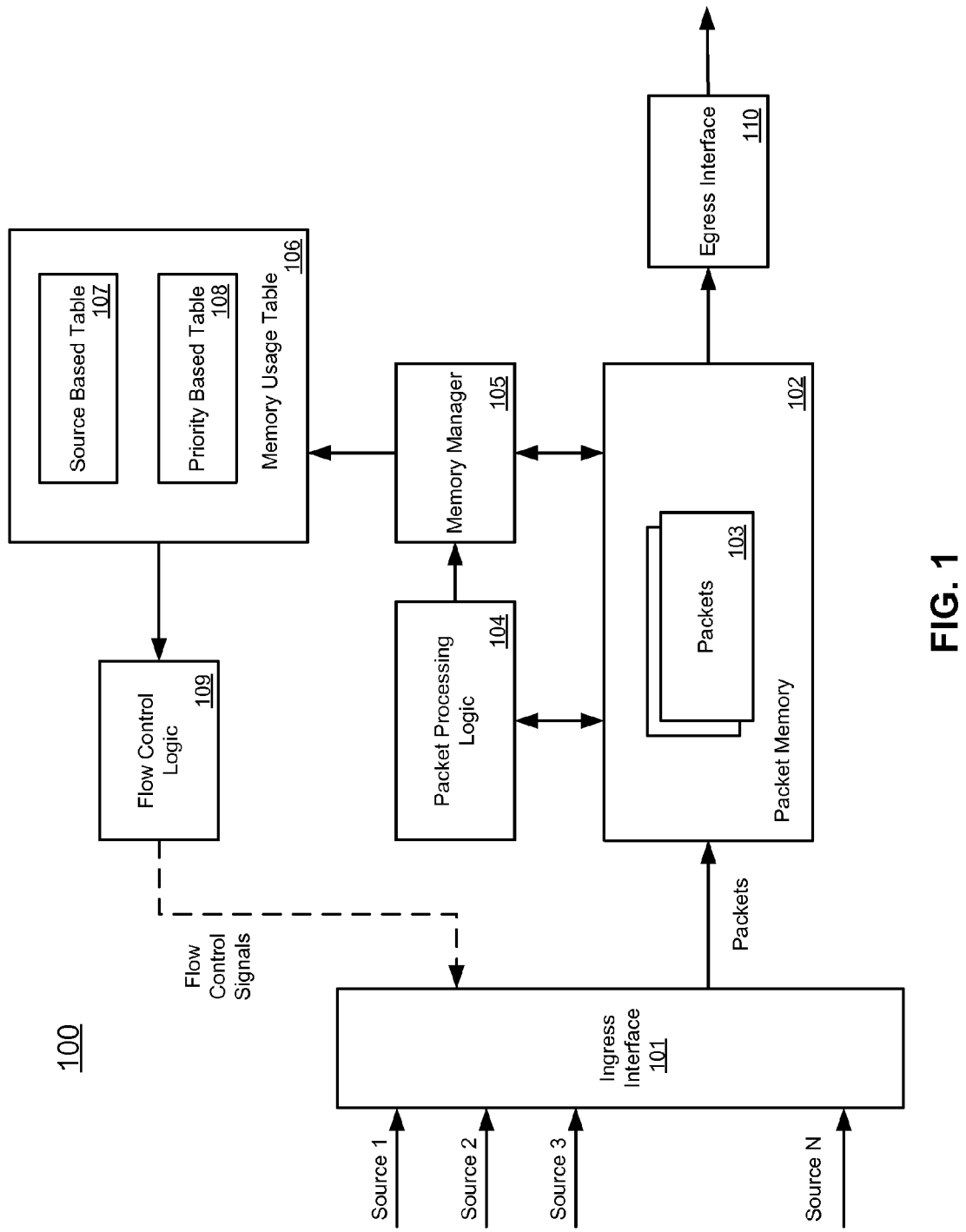
FIG. 1 is a block diagram illustrating an example of a packet processor according to one embodiment of the invention.

According some embodiments, a mechanism is provided to correctly reserve memory for incoming packets and a basis for out-of-band flow control to sources under memory constraint. In one embodiment, a tightly coupled method is utilized for memory reservation and flow control that depends on source and priority awareness of incoming packets. Packet memory is reserved both per source and per normalized priority. When a packet arrives, it is always admitted. In addition, its source and priority are used to account for the corresponding memory usage in its representative sources and priorities. A background process analyzes current usages across all sources and priorities and asserts flow control accordingly.

In addition, an embodiment of the invention also provides an abstract representation of a source. This may be used to differentiate between various types of "sources" such as packets received over channels from data plane endpoints (e.g., ingress processors, external ports), packets received from dedicated control plane channels, packets created internally within the respective processor, packet memory used for certain internal data structures, etc. This allows the same packet memory reservation and flow control infrastructure to be reused for all packet sources.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to some embodiments, packet memory reservation can be prioritized such that higher priority traffic is subject to higher memory availability than lower priority traffic. Memory reservation can be specific to sources such that certain sources may be given more memory resources then others, such that a source may never get starved because of the input volume from other sources. Flow control can be source specific in which if packet memory is unavailable or running low, then only the responsible sources are back-pressured and not all of them. Furthermore if traffic of a particular priority is resulting in low memory then only that particular priority may be back-pressured on all or only the responsible sources. "Sources" are not necessarily limited to external ports or ingress processors in the same router. Control plane channels and internal packet generation functions can be treated as sources too (because they consume packet memory). Hence sources need to be logically identified.

There could be many sources and priorities in a network element (e.g., router). A more complex variant may use priorities per source in which the total number of priorities is equal to the sum of all priorities per source. This may be used when there is no uniform notion of priorities across the sources. These sources and/or priorities are initialized with memory thresholds and other control information prior to being utilized. Once the sources and/or priorities are initialized, their current memory usages are updated in a fast path and analyzed in the background. Flow control decisions are made in the background. The same update and analysis process may be used for packets generated in the control plane and internally in the forwarding plane (each may be assigned a source and optionally, one or more priorities).

Embodiments of the invention provide a way to reserve memory for different sources and different priorities by using the concept of sources and priorities. The current usage (CU) levels and flow control thresholds (e.g., xon_t, xoff_t) of sources and priorities are used to generate source and priority specific out-of-band flow control. This flow control can coexist with in-band credit based flow controls and hence ensures completeness of flow control methods. The flow control decision is made in the background (e.g., a separate or independent process or thread). It may also be optionally made in the fast-path. In addition, embodiments of the invention enhance the above capabilities by using a source abstraction. One embodiment can be implemented in hardware such that several operations can be carried out in parallel and source and/or priority information can be maintained in very fast aliasing tables.

FIG. 1 is a block diagram illustrating an example of a packet processor according to one embodiment of the invention. Referring to FIG. 1, packet processor or processing unit 100 includes an ingress interface 101 to receive packets from multiple sources, where packets are admitted into packet memory 102 as packets 103 dependent upon the availability of packet memory 102. Packets 103 are processed by packet processing logic 104 and the processed packets may then be forwarded to an egress interface 110 to be transmitted to a next hop.

Processor 100 further includes memory manager 105, memory usage table 106, and flow control logic 109 for managing packet memory 102 and for flow control of packets to be admitted into packet memory 102. According to one embodiment, dependent upon the memory usage of packet memory 102, memory manager is adapted to update memory usage table 106. Based on the information of memory usage table 106, flow control logic 109 is configured to send one or more flow control signals to one or more sources for controlling further packet transmission from the sources. In one embodiment, memory usage table 106 includes source-based memory usage table 107 and priority-based memory usage table 108. Examples of source-based memory usage table 107 and priority-based memory usage table 108 are shown in FIGS. 2A and 2B according to some embodiments.

Referring to FIG. 2A, a source-based memory usage table includes multiple source records or entries. Each source record is associated with a source from which packets are received, where each source is identified by a source identifier (ID). Each source record includes an XON (transmission on) threshold, an XOFF (transmission off) threshold, a current usage, and an optional maximum usage, which may be configured by an administrator ahead of time.

Similarly, referring to FIG. 2B, a priority-based memory usage table includes multiple priority records or entries. Each priority record is associated with a priority identified by a priority ID. Each priority record includes an XON threshold, an XOFF threshold, a current usage, and an optional maximum usage, which may also be configured by an administrator ahead of time. Each packet received from a source can be associated with or prioritized by a priority based on a variety of parameters such as a channel through which the packet is received. Packets associated with a particular priority may be received from different or multiple sources. Similarly, packets received from a single source may be associated with different or multiple priorities.

Referring to FIGS. 1 and 2A-2B, when a packet is received at ingress interface 101 (also referred to as an ingress cone), for example, of a forwarding plane of a network element, the packet is admitted into packet memory 102 as part of packets 103. In addition, according to one embodiment, a source of the packet is identified, for example, based on an input channel through which the packet is received. The source of the packet is may be identified by ingress interface 101 or another logic such as an admittance circuit or functional block. Based on the identified source, memory manager 105 is configured to update current usage of source-based memory usage table 107 in view of a size of the packet in bytes. For example, the current usage of source-based memory usage table 107 is incremented by the size of the packet.

Further, according to one embodiment, a priority associated with the packet is also identified. A priority of a packet may be identified based on a variety of parameters. For example, the priority of a packet can be identified based on a channel through which the packet is received if a particular channel carries traffic of the same priority. Alternatively, the priority of a packet may be determined based on certain metadata stored in a header, or a specific part of the packet (e.g., 802.1P or DSCP bits). Based on the identified priority, memory manager 105 is configured to update the current usage of the corresponding priority record of priority-based memory usage table 108. For example, the current usage of the corresponding priority record is incremented in view of the size of the packet in bytes.

Furthermore, according to one embodiment, during packet processing performed by processing logic 104, if the priority of the packet or the size of the packet has been modified, memory manager 105 is notified and configured to update source-based memory usage table 107 and/or priority-based memory usage table 108 accordingly. For example, during the processing of a packet by processing logic 104, if the packet is duplicated, the current usage of a source associated with the packet is incremented in source-based memory usage table 107 and the current usage of a priority associated with the packet is also incremented in priority-based memory usage table 108. When a packet is transmitted from packet memory 102 to egress interface 110, the current usage of the packet is updated (e.g., decremented) in source-based memory usage table 107 and priority-based memory usage table 108.

According to one embodiment, independently and/or in parallel, flow control logic 109 is configured to, for example, via one or more processes or threads in the background, scan each record of source-based memory usage table 107 and/or priority-based memory usage table 108 to determine whether an appropriate flow control signal should be sent to a specific source or sources. In one embodiment, flow control logic 109 may include a scanner or scanning logic, which may be implemented in hardware, software, or a combination of both, to scan each record in source-based memory usage table 107 and/or priority-based memory usage table 108.

For example, referring to FIGS. 2A-2B, for each record, the scanner may compare the current usage of the record with the XON and/or XOFF thresholds. Dependent upon the current flow control state (e.g., XON or XOFF), which may be maintained within source-based and/or priority-based memory usage tables 107-108 (not shown) or in another repository, a flow control signal is transmitted to one or more sources when the corresponding current usage or usages satisfy a threshold or thresholds.

In one embodiment, for each record of source-based memory usage tale 107, if the current flow control or transmission state of a source is XON and the corresponding current usage reaches the corresponding XOFF threshold, an XOFF flow control signal is transmitted to the corresponding source. If the current flow control state of the source is XOFF and the corresponding current usage drops below the corresponding XON threshold, an XON flow control signal is transmitted to the source.

Similarly, according to one embodiment, for each record of priority-based memory usage table 108, if the current flow control or transmission state of a priority is XON and the corresponding current usage reaches the corresponding XOFF threshold, an XOFF flow control signal is transmitted to one or more sources associated with the corresponding priority. If the current flow control state of the source is XOFF and the corresponding current usage drops below the corresponding XON threshold, an XON flow control signal is transmitted to one or more sources associated with the corresponding priority. It is assumed that information mapping a priority with one or more sources is maintained, for example, via a mapping table (not shown).

The XON and XOFF thresholds are two different fields in the tables 107-108, so as to provide some degrees of hysteresis in the flow control signals. The sources and/or priorities may be stored anywhere in the memory (e.g., fast memory) preferably in a hierarchical structure. Maintaining a single global priority structure tends to consume less memory than maintaining multiple priorities per source (or vice versa). Every fast-path processing core can be given its own update field to save on mutex contention complexity. Thus, there is a speed-memory tradeoff as well as capability-memory tradeoff.

Embodiments of the invention described throughout this application can be implemented in a forwarding plane of a network element, such as, for example, a SmartEdge™ router available from Ericsson of Stockholm, Sweden. Conceptually it can also be implemented in any scenario where a single receiver may receive discrete data from multiple transmitters, for example, among different network elements or among different components (e.g., forwarding planes) within a network element. In one embodiment, the techniques described herein can be applied in ingress and egress processors of a forwarding plane of a network element. For example, remote line-facing ports can act as sources with respect to an ingress processor. Ingress processors can act as sources with respect to an egress processor, where packets may be received over backplane or mid-plane channels. Control plane channels and internal packet generation functions can be treated as sources with respect to ingress and/or egress processors. Note that some or all of the components as shown in FIG. 1 can be implemented in hardware, firmware, software, or a combination thereof.

Figure 3:
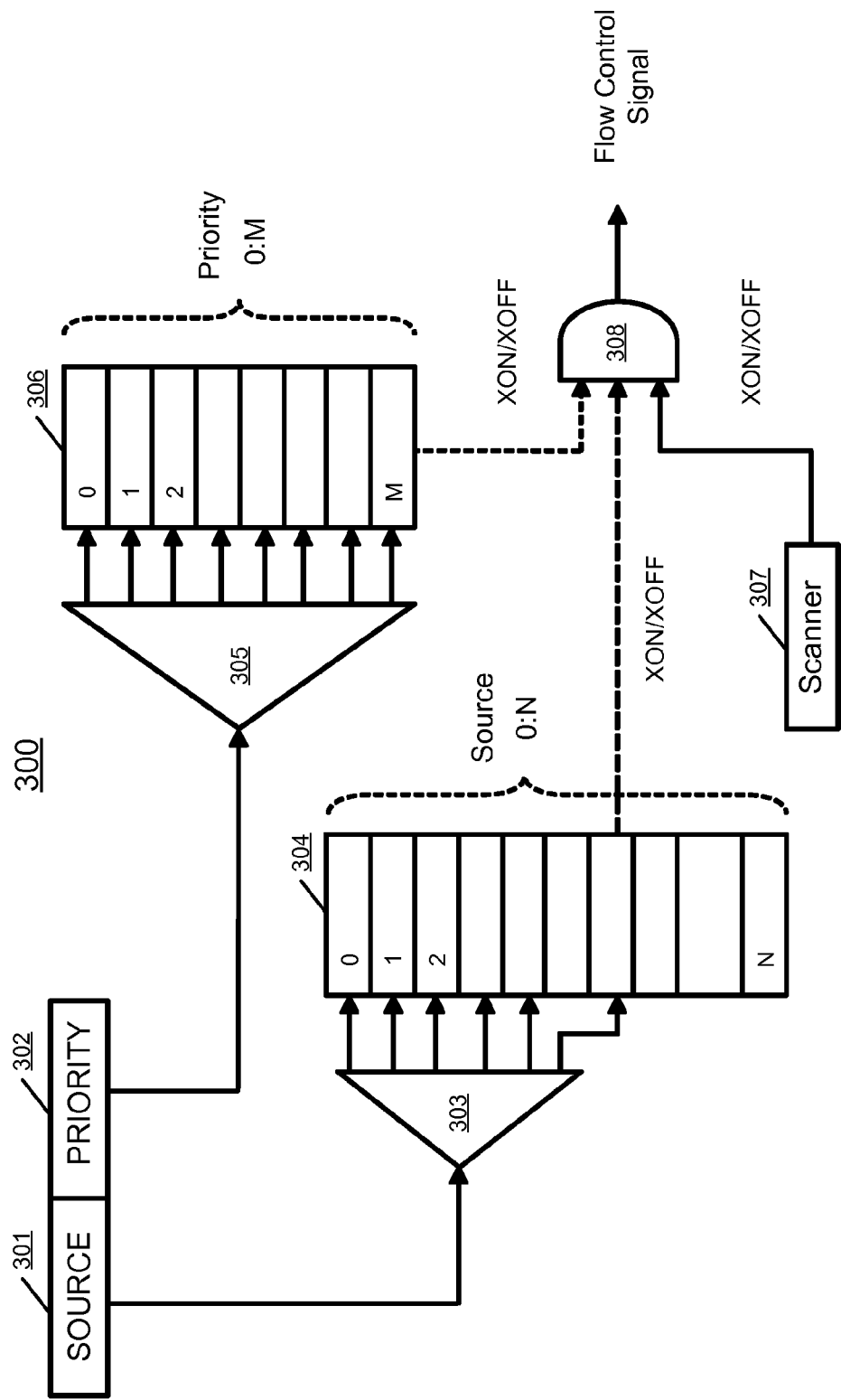
FIG. 3 is a block diagram illustrating a flow control mechanism according to one embodiment of the invention.

FIG. 3 is a block diagram illustrating a flow control mechanism according to one embodiment of the invention. For example, flow control mechanism 300 may be implemented as a part of processor 100 of FIG. 1. In this example, referring to FIG. 3, flow control mechanism 300 is implemented in hardware. In one embodiment, when a packet is received, source 301 and priority 302 of the packet are determined. Source 301 is demultiplexed via demultiplexer 303 into one of N sources 304 and priority 302 is demultiplexed via demultiplexer 304 into one of M priorities 305. The flow control can be induced via scanner 307 and can optionally be induced by a fast path after source/priority demultiplexers 303-304, via an AND gate 308. Here source 301 and priority 302 are used as a part of properties of demultiplexers 303-304 respectively in which operations of demultiplexing can be performed in parallel.

Figure 4:
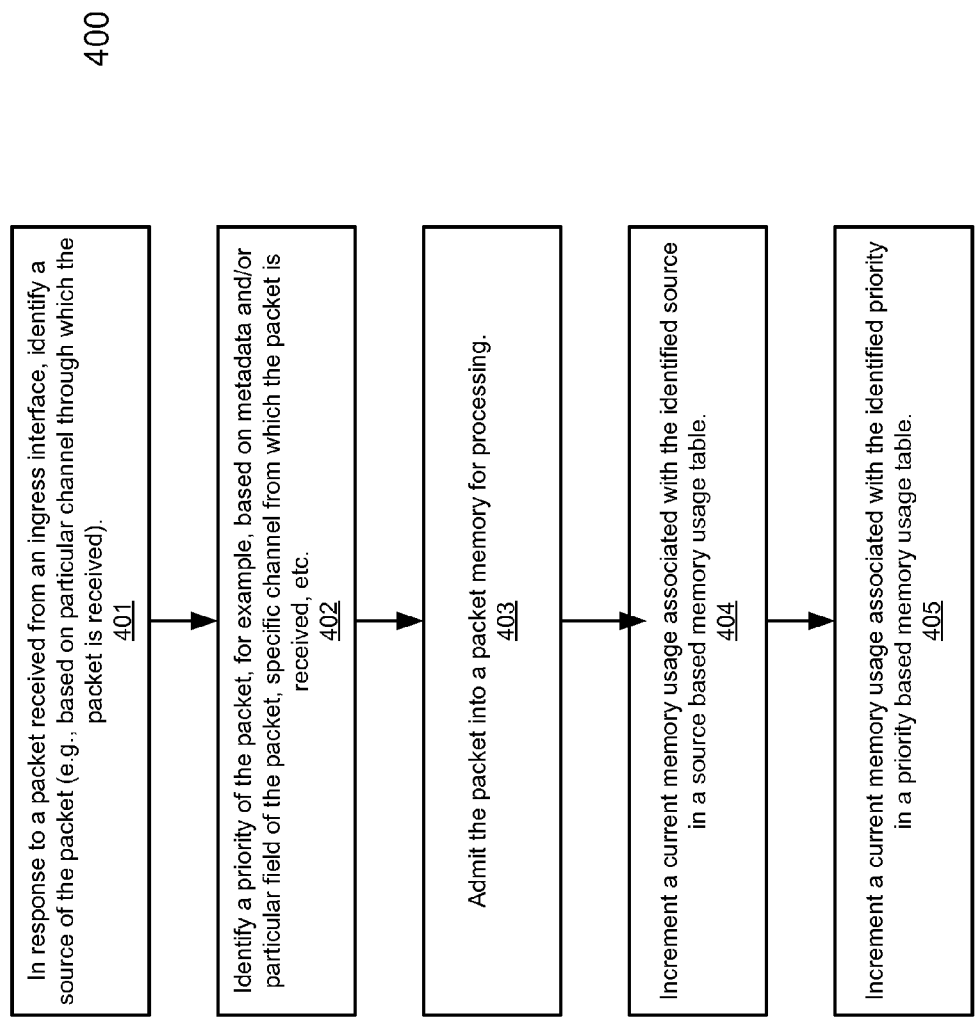
FIG. 4 is a flow diagram illustrating a method for packet memory reservation according to one embodiment of the invention.

FIG. 4 is a flow diagram illustrating a method for packet memory reservation according to one embodiment. Note that method 400 may be performed by processing logic which may include hardware, software, firmware, or a combination thereof. For example, method 400 may be performed by ingress interface 101 and/or memory manager 105 of FIG. 1. Referring to FIG. 4, in response to a packet received from an ingress interface, at block 401, a source (e.g., logical source) of the packet is identified, for example, based on a particular channel through which the packet is received. At block 402, a priority associated with the packet is identified, for example, based on metadata and/or a particular field of the packet, or a specific channel from which the packet is received, etc. At block 403, the packet is admitted into a packet memory. At block 404, a current memory usage associated with the identified source is incremented in a source-based memory usage table. At block 405, a current memory usage associated with the identified priority is incremented in a priority-based memory usage table. These tables can be used for flow control decisions subsequently.

In one embodiment, packets generated internally within a forwarding plane or a control plane may be admitted via an admittance update function or logic that performs method 400. In the fast path, this logic may be encoded in a packet processing loop. Note that packet memory may also be used for certain internal fast-path data structures. In general, admittance update functions may be utilized whenever a packet memory allocation is requested. This assumes that every such a request is satisfied by a source and a priority.

Figure 5:
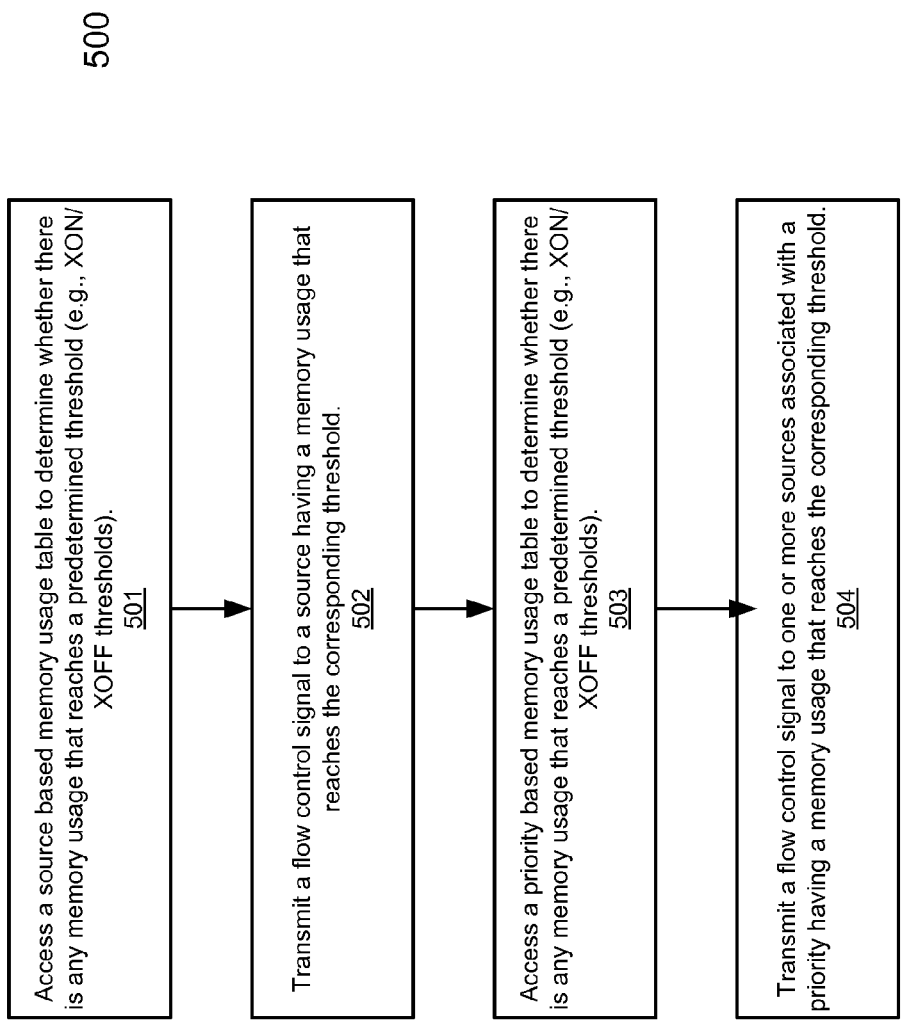
FIG. 5 is a flow diagram illustrating a method for flow control according to one embodiment of the invention.

FIG. 5 is a flow diagram illustrating a method for flow control according to one embodiment. Note that method 500 may be performed by processing logic which may include hardware, software, firmware, or a combination thereof. For example, method 500 may be performed by flow control logic 109 of FIG. 1. Referring to FIG. 5, at block 501, a source-based memory usage table is accessed to determine whether there is any memory usage that reaches a predetermined threshold (e.g., XON/XOFF thresholds) in view of a current flow control state (e.g., XON or XOFF state). At block 502, a flow control signal is transmitted to a source having a memory usage that reaches the corresponding threshold. At block 503, a priority-based memory usage table is accessed to determine whether there is any memory usage that reaches a predetermined threshold in view of the current flow control state. At block 504, a flow control signal is transmitted to one or more sources associated with a priority having a memory usage that reaches the corresponding threshold.

Figure 6:
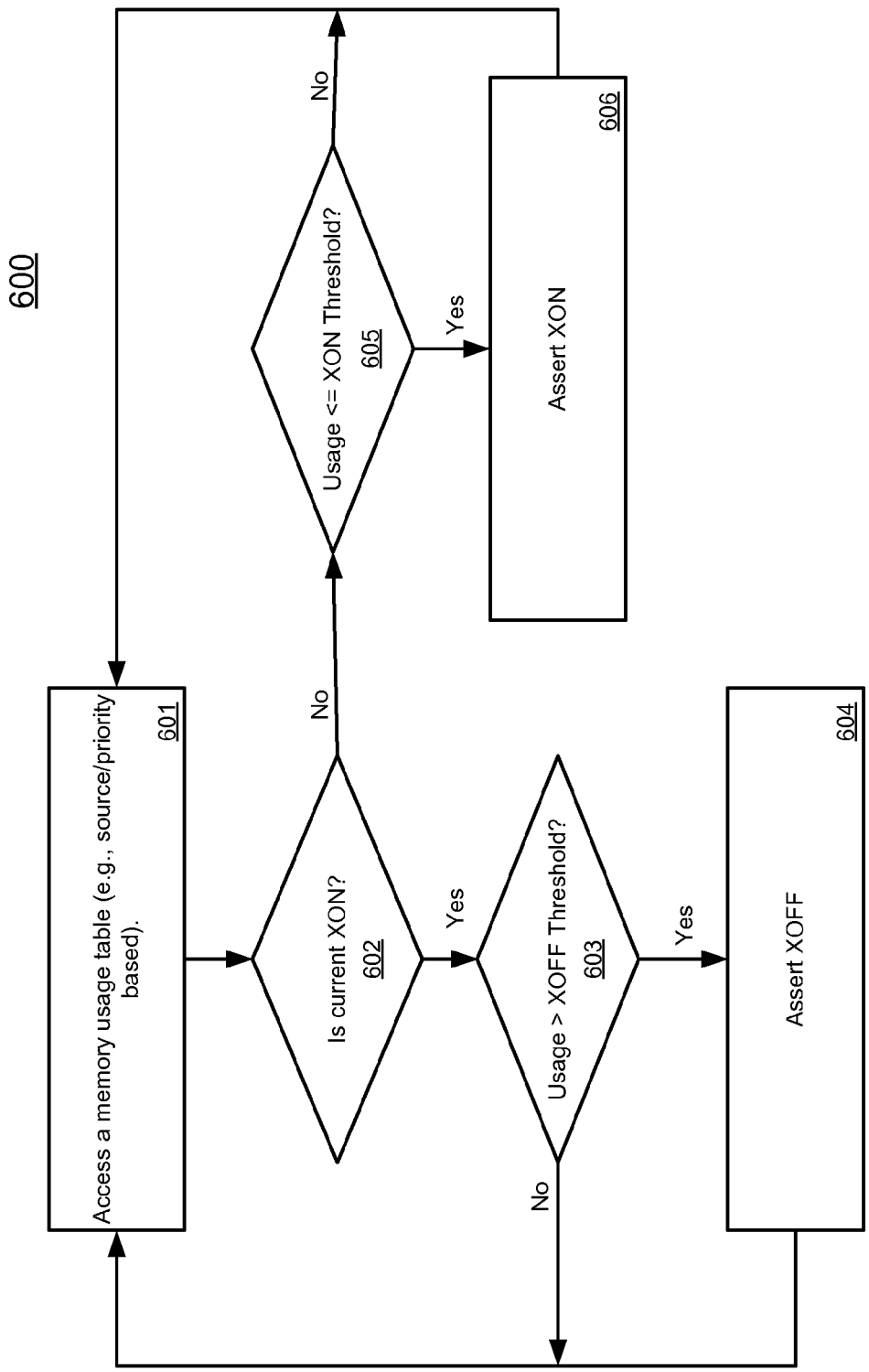
FIG. 6 is a flow diagram illustrating a method for flow control according to another embodiment of the invention.

FIG. 6 is a flow diagram illustrating a method for flow control according to another embodiment of the invention. For example, method 600 may be performed as part of operations involved in blocks 501 and 503 of FIG. 5. Referring to FIG. 6, at block 601, a memory usage table (e.g., source-based or priority-based) is accessed. For each record of the memory usage table, at block 602, if the current flow control state is XON and at block 603, if the current usage is greater than the corresponding XOFF threshold, an XOFF flow control signal is asserted at block 604. If the current flow control state is XOFF, at block 605, it is determined whether the current usage is less than or equal to the XON threshold. If so, an XON flow control signal is asserted at block 606.

Method 600 may be recursively performed in the background via a separate thread or process for all sources and priorities. Both source-based and priority-based memory usage tables may be accessed via a single thread and it does not write to the usage state so there is no contention with the fast past stages. Furthermore, the current XON/XOFF state and usage state may not be read within the same cycle. Thus, a flow control state is changed via a single thread. The operations performed in the background may be performed in a multithreaded manner when there is no fast path performance penalty. The background scanning process may be performed in a preemptive scheduling kernel or as part of a timer interrupt.

Figure 7:
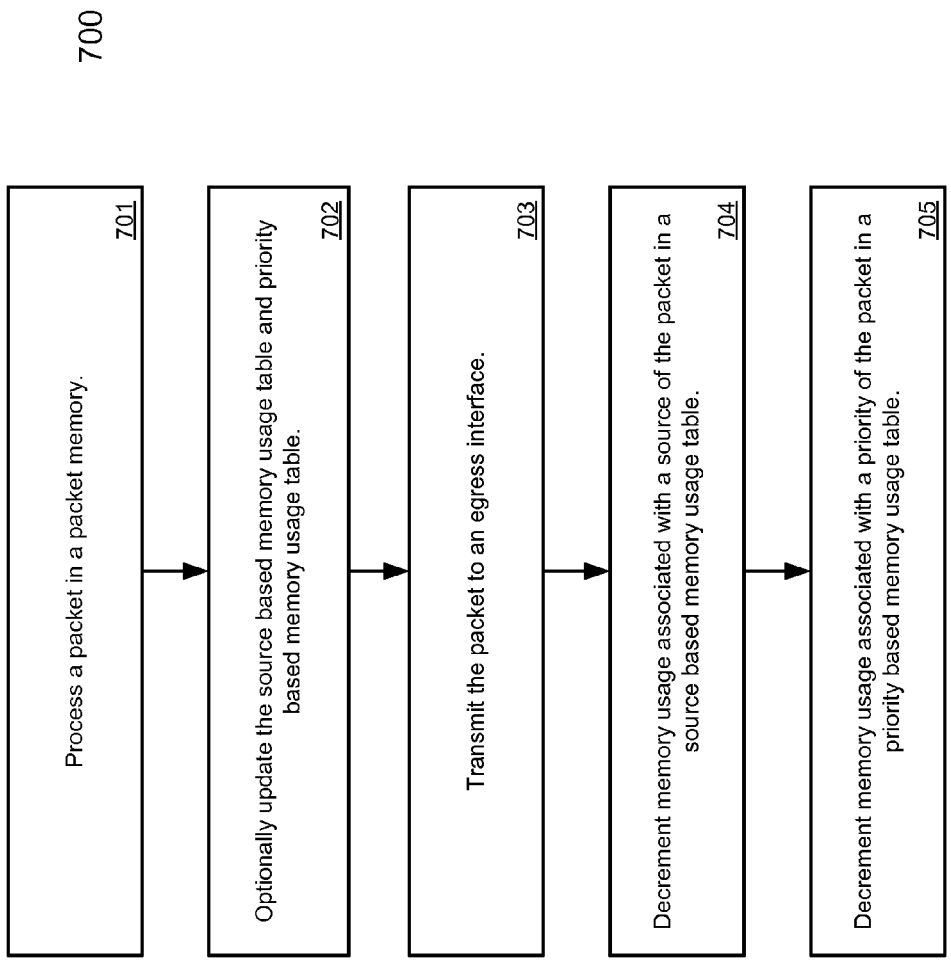
FIG. 7 is a flow diagram illustrating a method for packet memory reservation according to another embodiment of the invention.

FIG. 7 is a flow diagram illustrating a method for packet memory reservation according to another embodiment. Referring to FIG. 7, at block 701, a packet is processed, for example, by packet processing logic 104 of FIG. 1. Based on the result of the processing, at block 702, source-based and priority-based memory usage tables may be updated, for example, if the priority of a packet has been changed or a packet has been duplicated, etc. At block 703, the packet is transmitted to an egress interface from the packet memory. At block 704, the current usage of the corresponding record in a source-based memory usage table is decremented and the current usage of the corresponding record in a priority-based memory usage table is also decremented at block 705.

Figure 8A:
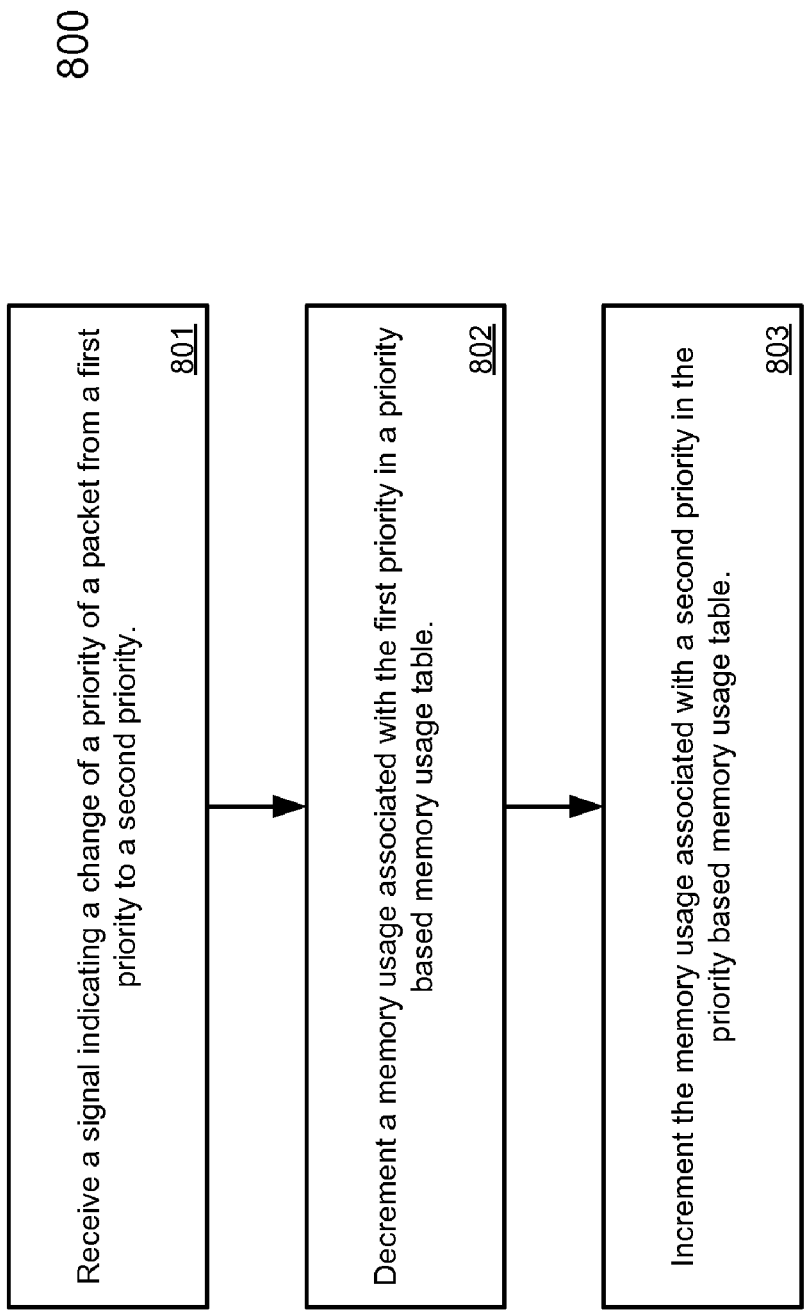
FIGS. 8A-8B are flow diagrams illustrating a method for packet memory reservation according to some embodiments of the invention.

FIG. 8A is a flow diagram illustrating a method for packet memory reservation according to another embodiment. Referring to FIG. 8A, at block 801, a signal is received indicating a change of a priority of a packet from a first priority to a second priority. Such a signal may be received from packet processing logic 104 of FIG. 1. In response, at block 802, a memory usage associated with the first priority is decremented in the priority-based memory usage table. At block 503, a memory usage associated with the second priority is incremented in the priority-based memory usage table.

Figure 8B:
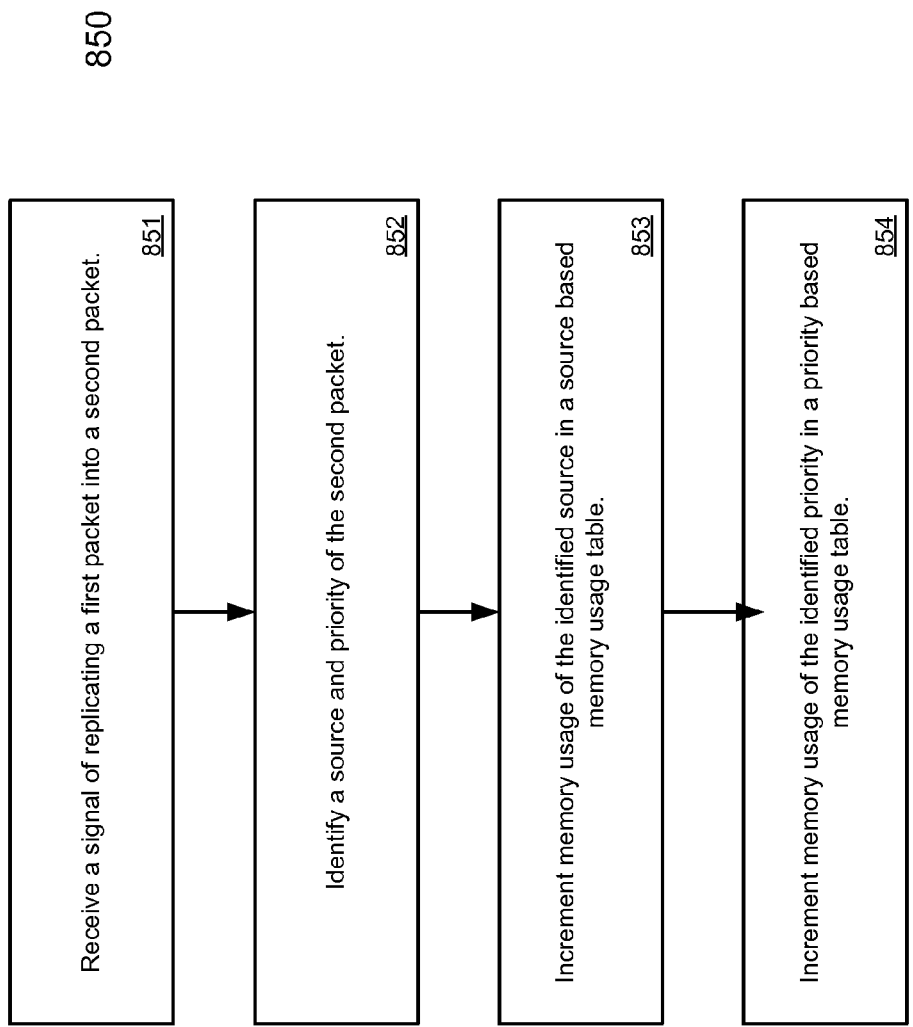

FIG. 8B is a flow diagram illustrating a method for packet memory reservation according to another embodiment. Referring to FIG. 8B, at block 851, a signal is received indicating that a packet has been duplicated from a first packet to a second packet. At block 852, source and priority are identified for the second packet. At block 853, the memory usage of the identified source is incremented in the source-based memory usage table and at block 854, the memory usage of the identified priority is incremented in the priority-based memory usage table.

Figure 9:
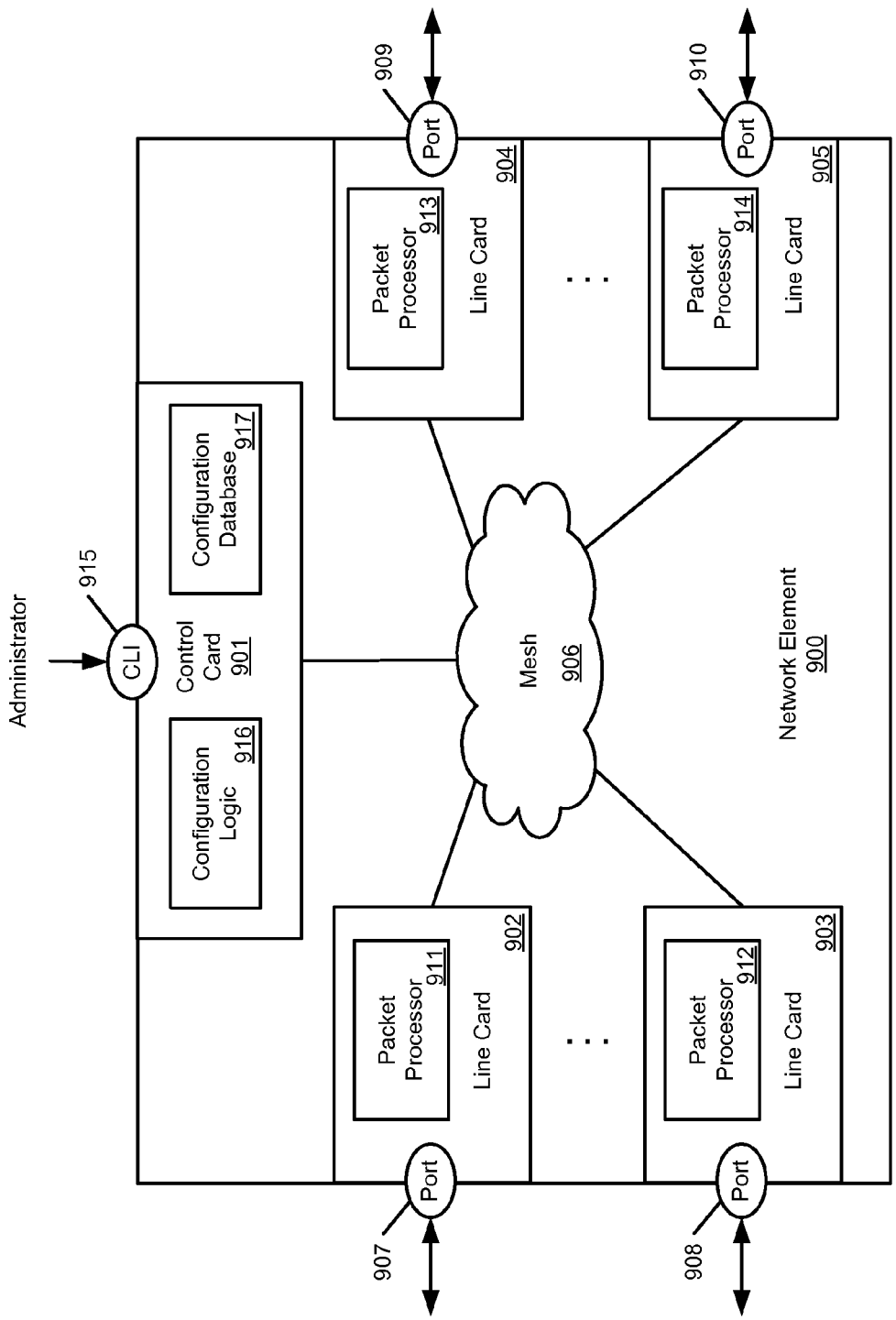
FIG. 9 is a block diagram illustrating a network element according to one embodiment of the invention.

FIG. 9 is a block diagram illustrating a network element according to one embodiment of the invention. Network element 900 may be implemented as any one network element having a packet processor as shown in FIG. 1. Referring to FIG. 9, network element 900 includes, but is not limited to, a control card 901 (also referred to as a control plane) communicatively coupled to one or more line cards 902-905 (also referred to as interface cards or user planes) over a mesh 906, which may be a mesh network, an interconnect, a bus, or a combination thereof. A line card is also referred to as a data plane (sometimes referred to as a forwarding plane or a media plane). Each of the line cards 902-905 is associated with one or more interfaces (also referred to as ports), such as interfaces 907-910 respectively. Each line card includes a packet processor, routing functional block or logic (e.g., blocks 911-914) to route and/or forward packets via the corresponding interface according to a configuration (e.g., routing table) configured by control card 901, which may be configured by an administrator via an interface 915 (e.g., a command line interface or CLI). According to one embodiment, control card 901 includes, but is not limited to, configuration logic 916 and database 917 for storing information configured by configuration logic 916.

In one embodiment, each of the processors 911-914 may be implemented as a part of processor 100 of FIG. 1. Each processor is adapted to maintain a source-based memory usage table and a priority-based usage table, as well as a memory manager and flow control logic described above. Note that with respect to a processor of a particular line card, a source may be another network element external to network element 900. Alternatively, a source may be another component within network element 900, dependent upon the direction of the traffic. For example, with respect to processor 911 of line card 902, a source may be an external network element, control card 901, or any of the line cards 903-905, dependent upon the traffic directions.

Referring back to FIG. 9, in the case that network element 900 is a router (or is implementing routing functionality), control plane 901 typically determines how data (e.g., packets) is to be routed (e.g., the next hop for the data and the outgoing port for that data), and the data plane (e.g., lines cards 902-903) is in charge of forwarding that data. For example, control plane 901 typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane (e.g., database 908). Control plane

901 programs the data plane (e.g., line cards 902-903) with information (e.g., adjacency and route information) based on the routing structure(s). For example, control plane 901 programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main routing information base (RIB) based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element 900 can store one or more bridging tables that are used to forward data based on the layer 2 information in this data.

Typically, a network element may include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms. As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, palm tops, mobile phones, smart phones, multimedia phones, Voice Over Internet Protocol (VoIP) phones, portable media players, global positioning system (GPS) units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public Web pages (free content, store fronts, search services, etc.), private Web pages (e.g., username/password accessed Web pages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Note that network element 900 is described for the purpose of illustration only. More or fewer components may be implemented dependent upon a specific application. For example, although a single control card is shown, multiple control cards may be implemented, for example, for the purpose of redundancy. Similarly, multiple line cards may also be implemented on each of the ingress and egress interfaces. Also note that some or all of the components as shown in FIG. 9 may be implemented in hardware, software, or a combination of both.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed in a network element for managing a packet memory and controlling further packet admittance into the packet memory based on a memory usage of the packet memory, the method comprising:
   accessing a source-based memory usage table to identify a source having a memory usage of the packet memory satisfying a predetermined memory usage threshold for the packet memory, the source-based memory usage table including a plurality of source records, each source record corresponding to a source from which packets are received by the network element, each source record including a current memory usage of the packet memory based on the size of the packets received from the corresponding source that are currently in the packet memory and a predetermined memory usage threshold for the packet memory of the corresponding source;
   transmitting a first flow control signal to the identified source whose memory usage of the packet memory satisfies the corresponding predetermined memory usage threshold for the packet memory to control further packet transmission from the identified source;
   accessing a priority-based memory usage table to identify a priority of which a memory usage of the packet memory satisfies a predetermined memory usage threshold for the packet memory of the priority, the priority-based memory usage table including a plurality of priority records, each priority record corresponding with a priority and including a current memory usage of the packet memory based on the size of packets currently in the packet memory of the corresponding priority and a predetermined memory usage threshold for the packet memory associated with the corresponding priority; and
   transmitting a second flow control signal to a set of one or more sources associated with the identified priority having a memory usage of the packet memory satisfying the corresponding predetermined memory usage threshold for the packet memory to control further packet transmission from the identified set of sources.

2. The method of claim 1, wherein each source record of the source-based memory usage table further includes an XON threshold and an XOFF threshold.

3. The method of claim 2, further comprising:
   for each source record in the source-based memory usage table, performing the following:
      determining a current flow control state of the corresponding source, the current flow control state being one of an XON state and an XOFF state;
      determining whether a current memory usage of the packet memory as indicated by the source record is greater than the corresponding XON threshold if the current flow control state of the source is an XON state; and
      asserting an XOFF control signal to the source corresponding with the source record, if the current memory usage of the packet memory as indicated by the source record is greater than the corresponding XON threshold and the current flow control state of the source is an XON state.

4. The method of claim 3, further comprising for each source record, asserting an XON control signal to the corresponding source if the current memory usage of the packet memory as indicated by the source record is less than or equal to the corresponding XOFF threshold and the current flow control state of the corresponding source is an XOFF state.

5. The method of claim 1, wherein each priority record of the priority-based memory usage table further includes an XON threshold and an XOFF threshold.

6. The method of claim 5, further comprising:
   for each priority record in the priority-based memory usage table, determining a current flow control state of one or more sources associated with the priority of the priority record, the current flow control state being one of an XON state and an XOFF state;
   for each source associated with the priority, performing the following:
      determining whether a current memory usage of the packet memory as indicated by the priority record is greater than the corresponding XON threshold if the current flow control state of the source is an XON state; and
      asserting an XOFF control signal to the source if the current memory usage of the packet memory as indicated by the priority record is greater than the corresponding XON threshold and the current flow control state of the source is an XON state.

7. The method of claim 6, wherein for each source associated with the priority, further asserting an XON control signal to the source if the current memory usage of the packet memory as indicated by the priority record is less than or equal to the corresponding XOFF threshold and the current flow control state of the source is an XOFF state.

8. The method of claim 1, further comprising:
   in response to a first packet received from an ingress interface,
      admitting the first packet into the packet memory;
      identifying a source from which the first packet is received;
      incrementing a memory usage of the packet memory in a source record of the source-based memory usage table that corresponds with the identified source by the size of the first packet;
      identifying a priority of the first packet; and
      incrementing a memory usage of the packet memory in a priority record of the priority-based memory usage table that corresponds with the identified priority by the size of the first packet.

9. The method of claim 8, further comprising:
   transmitting a second packet from the packet memory to an egress interface;
   decrementing a memory usage of the packet memory of a source record in the source-based memory usage table that corresponds with a source from which the second packet is received by the size of the second packet; and
   decrementing a memory usage of the packet memory of a priority record in the priority-based memory usage table that corresponds is associated with a priority of the second packet by the size of the second packet.

10. The method of claim 8, further comprising:
    receiving a signal indicating a change of priority of a third packet from a first priority to a second priority, wherein the third packet is a packet in the packet memory;
    decrementing a memory usage of the packet memory of a first priority record of the priority-based memory usage table that corresponds with the first priority by the size of the third packet; and incrementing a memory usage of the packet memory of a second priority record of the priority-based memory usage table that corresponds with the second priority by the size of the third packet.

11. The method of claim 8, further comprising:
receiving a signal indicating that a fourth packet has been replicated to a fifth packet, wherein the fourth packet and the fifth packet are packets in the packet memory;
identifying a source and a priority of the fifth packet;
incrementing a memory usage of the packet memory of a source record in the source-based memory usage table that corresponds with the identified source of the fifth packet by the size of the fifth packet; and
incrementing a memory usage of the packet memory of a priority record in the priority-based memory usage table that corresponds with the identified priority of the fifth packet by the size of the fifth packet.

12. A packet processor in a network element for processing packets, the packet processor comprising:
a packet memory that is to store packets;
a memory that is to store a source-based memory usage table and a priority-based memory usage table; and
a flow control logic that is to access the source-based memory usage table to identify a source having a memory usage of the packet memory satisfying a predetermined memory usage threshold for the packet memory, the source-based memory usage table including a plurality of source records, each source record corresponding to a source from which packets are received by the network element, each source record including a current memory usage of the packet memory based on the size of the packets received from the corresponding source that are currently in the packet memory and a predetermined memory usage threshold for the packet memory corresponding with the corresponding source,
wherein the flow control logic is to transmit a first flow control signal to the identified source whose memory usage of the packet memory satisfies the corresponding predetermined memory usage threshold for the packet memory to control further packet transmission from the identified source,
wherein the flow control logic is to access the priority-based memory usage table to identify a priority of which a memory usage of the packet memory satisfies a predetermined memory usage threshold for the packet memory of the priority, the priority-based memory usage table including a plurality of priority records, each priority record corresponding with a priority and including a current memory usage of the packet memory based on the size of packets currently in the packet memory of the corresponding priority and a predetermined memory usage threshold for the packet memory associated with the corresponding priority, and
wherein the flow control logic is to transmit a second flow control signal to a set of one or more sources associated with the identified priority having a memory usage of the packet memory satisfying the corresponding predetermined memory usage threshold for the packet memory to control further packet transmission from the identified set of sources.

13. The packet processor of claim 12, wherein each source record of the source-based memory usage table further includes an XON threshold and an XOFF threshold, wherein the flow control logic is further to, for each source record in the source-based memory usage table, perform the following:

determine a current flow control state of the corresponding source, the current flow control state being one of an XON state and an XOFF state,
determine whether a current memory usage of the packet memory as indicated by the source record is greater than the corresponding XON threshold if the current flow control state of the source is an XON state,
assert an XOFF control signal to the source corresponding with the source record, if the current memory usage of the packet memory as indicated by the source record is greater than the corresponding XON threshold and the current flow control state of the source is an XON state, and
assert an XON control signal to the source corresponding with the source record, if the current memory usage of the packet memory as indicated by the source record is less than or equal to the corresponding XOFF threshold and the current flow control state of the source is an XOFF state.

14. The packet processor of claim 12, wherein each priority record of the priority-based memory usage table further includes an XON threshold and an XOFF threshold, wherein the flow control logic is further to:
for each priority record in the priority-based memory usage table, determine a current flow control state of one or more sources associated with the priority of the priority record, the current flow control state being one of an XON state and an XOFF state,
for each source associated with the priority, perform the following:
determine whether a current memory usage of the packet memory as indicated by the priority record is greater than the corresponding XON threshold if the current flow control state of the source is an XON state,
assert an XOFF control signal to the source if the current memory usage of the packet memory as indicated by the priority record is greater than the corresponding XON threshold and the current flow control state of the source is an XON state, and
assert an XON control signal to the source if the current memory usage for the packet memory as indicated by the priority record is less than or equal to the corresponding XOFF threshold and the current flow control state of the source is an XOFF state.

15. The packet processor of claim 12, further comprising:
a memory manager that is to, in response to a first packet received from an ingress interface,
admit the first packet into the packet memory,
identify a source from which the first packet is received,
increment a memory usage of the packet memory in a source record of the source-based memory usage table that corresponds is associated with the identified source by the size of the first packet,
identify a priority of the first packet, and
increment a memory usage of the packet memory in a priority record of the priority-based memory usage table that corresponds with the identified priority by the size of the first packet.

16. The packet processor of claim 12, further comprising:
a transmitter that is to transmit a second packet from the packet memory to an egress interface; and
a memory manager that is to decrement a memory usage of the packet memory of a source record in the source-based memory usage table that corresponds with a source from which the second packet is received by the size of the second packet, and wherein a memory manager is to decrement a memory usage of the packet memory of a priority record in the priority-based memory usage table that corresponds with a priority of the second packet by the size of the second packet.

17. The packet processor of claim 12, further comprising a memory manager that is to:
   receive a signal indicating a change of priority of a third packet from a first priority to a second priority, wherein the third packet is a packet in the packet memory,
   decrement a memory usage of the packet memory of a first priority record of the priority-based memory usage table that corresponds with the first priority by the size of the third packet, and
   increment a memory usage of the packet memory of a second priority record of the priority-based memory usage table that corresponds with the second priority by the size of the third packet.

18. The packet processor of claim 12, further comprising a memory manager that is to:
   receive a signal indicating that a fourth packet has been replicated to a fifth packet, wherein the fourth packet and the fifth packet are packets in the packet memory,
   identify a source and a priority of the fifth packet,
   increment a memory usage of the packet memory of a source record of the source-based memory usage table that corresponds with the priority by the size of the fifth packet, and
   increment a memory usage of the packet memory of a priority record of the priority-based memory usage table that corresponds with the priority by the size of the fifth packet.

19. A network element, comprising:
   one or more control cards; and
   one or more line cards, each line card including a packet processor, each packet processor including:
      a packet memory that is to store packets,
      a memory that is to store a source-based memory usage table and a priority-based memory usage table, and
      a flow control logic that is to access the source-based memory usage table to identify a source having a memory usage of the packet memory satisfying a predetermined memory usage threshold for the packet memory, the source-based memory usage table including a plurality of source records, each source record corresponding to a source from which packets are received by the network element, each source record including a current memory usage of the packet memory based on the size of the packets received from the corresponding source that are currently in the packet memory and a predetermined memory usage threshold for the packet memory corresponding with the respective source,
      wherein the flow control logic is to transmit a first flow control signal to the identified source whose memory usage of the packet memory satisfies the corresponding predetermined memory usage threshold for the packet memory to control further packet transmission from the identified source,
      wherein the flow control logic is to access the priority-based memory usage table to identify a priority of which a memory usage of the packet memory satisfies a predetermined memory usage threshold for the packet memory of the priority, the priority-based memory usage table including a plurality of priority records, each priority record corresponding with a priority and including a current memory usage of the packet memory based on the size of packets currently in the packet memory of the corresponding priority and a predetermined memory usage threshold for the packet memory associated with the respective priority, and
      wherein the flow control logic is to transmit a second flow control signal to a set of one or more sources associated with the identified priority having a memory usage of the packet memory satisfying the corresponding predetermined memory usage threshold for the packet memory to control further packet transmission from the identified set of sources.

20. The network element of claim 19, wherein each source record of the source-based memory usage table further includes an XON threshold and an XOFF threshold, wherein the flow control logic is further to:
   for each source record in the source-based memory usage table, perform the following:
      determine a current flow control state of the corresponding source, the current flow control state being one of an XON state and an XOFF state,
      determine whether a current memory usage of the packet memory as indicated by the source record is greater than the corresponding XON threshold if the current flow control state of the source is an XON state,
      assert an XOFF control signal to the source corresponding with the source record, if the current memory usage of the packet memory for the source record is greater than the corresponding XON threshold and the current flow control state of the source is an XON state, and
      assert an XON control signal to the source corresponding with the source record, if the current memory usage of the packet memory for the source record is less than or equal to the corresponding XOFF threshold and the current flow control state of the source is an XOFF state.

21. The network element of claim 19, wherein each priority record of the priority-based memory usage table further includes an XON threshold and an XOFF threshold, wherein the flow control logic is further to:
   for each priority record in the priority-based memory usage table, determine a current flow control state of one or more sources associated with the priority of the priority record, the current flow control state being one of an XON state and an XOFF state,
   for each source associated with the priority, perform the following:
      determine whether a current memory usage of the packet memory as indicated by the priority record is greater than the corresponding XON threshold if the current flow control state of the source is an XON state,
      assert an XOFF control signal to the source if the current memory usage of the packet memory as indicated by the priority record is greater than the corresponding XON threshold and the current flow control state of the source is an XON state, and
      assert an XON control signal to the source if the current memory usage of the packet memory as indicated by the priority record is less than or equal to the corresponding XOFF threshold and the current flow control state of the source is an XOFF state.

* * * * *

UNITED STATES PATENT AND TRADEMARK OFFICE
CERTIFICATE OF CORRECTION

| | |
|---|---|
| PATENT NO. | : 8,233,390 B2 |
| APPLICATION NO. | : 12/710239 |
| DATED | : July 31, 2012 |
| INVENTOR(S) | : Pritam |

It is certified that error appears in the above-identified patent and that said Letters Patent is hereby corrected as shown below:

In Column 12, Line 58, in Claim 9, delete "corresponds is associated with" and insert -- corresponds with --, therefor.

In Column 14, Line 52, in Claim 15, delete "corresponds is associated with" and insert -- corresponds with --, therefor.

Signed and Sealed this
Twenty-seventh Day of November, 2012

David J. Kappos
*Director of the United States Patent and Trademark Office*